United States Patent [19]

Böhm et al.

[11] Patent Number: 4,528,331

[45] Date of Patent: Jul. 9, 1985

[54] SEALANT COMPOSITIONS HAVING, AS AN ESSENTIAL COMPONENT, HYDROGENATED POLYBUTADIENE AS NETWORK POLYMER

[75] Inventors: Georg G. A. Böhm, Akron; Mario DeTrano, Massillon; James E. Hall, Akron, all of Ohio

[73] Assignee: The Firestone Tire & Rubber Company, Akron, Ohio

[21] Appl. No.: 604,290

[22] Filed: Apr. 26, 1984

Related U.S. Application Data

[62] Division of Ser. No. 261,426, May 7, 1981, Pat. No. 4,445,562.

[51] Int. Cl.$^3$ ............................................ C08F 136/06
[52] U.S. Cl. .................................... 525/313; 523/166
[58] Field of Search ........................ 525/313; 523/166; 524/490

[56] References Cited

U.S. PATENT DOCUMENTS

| | | | |
|---|---|---|---|
| 3,935,893 | 2/1976 | Stang et al. | 152/347 |
| 3,981,342 | 9/1976 | Farber et al. | 152/347 |
| 4,064,922 | 12/1977 | Farber et al. | 152/347 |
| 4,113,799 | 9/1978 | Van Ornum et al. | |
| 4,445,562 | 5/1984 | Böhm et al. | 152/347 |

*Primary Examiner*—Allan M. Lieberman
*Assistant Examiner*—Robert E. L. Sellers, II
*Attorney, Agent, or Firm*—Daniel N. Hall

[57] ABSTRACT

A conventional sealant composition having as its essential rubber components (1) at least one high molecular weight, hydrogenated polybutadiene polymer, and (2) at least one low molecular weight liquid elastomer, i.e., polybutene, as tackifying polymer, compatible to a high degree with said hydrogenated polymer; the resultant sealant composition reflecting a co-continuous phase morphology wherein said hydrogenated polymer provides a crosslinked network in said compatible low molecular weight liquid elastomer.

9 Claims, No Drawings

SEALANT COMPOSITIONS HAVING, AS AN ESSENTIAL COMPONENT, HYDROGENATED POLYBUTADIENE AS NETWORK POLYMER

This application is a division of application Ser. No. 261,426, filed May 7, 1981, now U.S. Pat. No. 4,445,562, May 1, 1984.

BACKGROUND OF THE INVENTION

For safety, pneumatic tires have been historically sought which have a means of retarding or preventing their deflation upon being punctured. Many methods and tire constructions have been suggested and used for this purpose, mostly without significant commercial success for conventional passenger vehicles such as automobiles which are to be driven over typical roadways; this lack of commercial success has been due to high cost, complexity as to design and poor sealant performance. Fluid puncture sealants which seal by flowing into the puncture hole have not been entirely successful because they tend to cause the tire to become out of balance or tend to have varying flow properties over a wide temperature range. Central cores of cellular material which will physically maintain the tire shape when punctured have been suggested. However, such cores place a serious restriction on the vehicular maximum speed or endurance due to degradation of the core.

Puncture sealing tubeless tires have previously been proposed, containing, in the area of the tire normally most subject to punctures (that is, the undertread or the area extending across the crown of the tire at least from one shoulder to the other), a layer of sealant composition which has viscoelastic and adhesive qualities such that the composition tends to stick to a puncturing object, and, when the puncturing object is withdrawn, tends to flow into the opening or puncture, forming a plug which seals the opening against loss of air from the tires. Unfortunately, it has proven difficult to provide a composition which would flow into the puncture hole and yet have sufficient viscosity to prevent it from flowing at elevated temperatures such as exist in an automobile pneumatic tire under operating conditions. The problem is complicated by the extreme centrifugal force to which the composition is subjected as the tire rotates at high speed, since such centrifugal force tends to cause the composition to flow into the central crown area, leaving the areas near the shoulder unprotected. Furthermore, it has proven difficult to provide a sealant composition which would retain this desired balance of viscosity, adhesion and conformability over an extended period of service.

Various elastomer-based compositions, both cured and uncured, have been proposed as puncture sealants. In the uncured state, although they may function as sealants, they will sometimes tend to "cold flow" or flow at elevated temperatures such as are encountered in tires during use. This flow is undesirable. When they are crosslinked (cured) to prevent flow, these materials can lose the adhesion and conformability of the uncured state, and thus no longer act as sealants.

DESCRIPTION OF THE PRIOR ART

Typical prior art patents include the following; the substance of each is incorporated by reference:

U.S. Pat. No. 3,952,787:

This patent teaches the preparation of a rubber (sealant) composition comprising a polymer of ethylene-propylene copolymer or ethylene-propylene-diene terpolymer, with polybutene and an inorganic filler. There is no suggestion or teaching in this patent of our specific sealant components or their collective performance as herein described.

U.S. Pat. No. 3,981,342:

This patent is directed to a puncture sealing composition in combination with a pneumatic tire; said composition is exemplified by a blend of depolymerized NR and 40 parts cis-polyisoprene, partially crosslinked with 6 parts of tetra-n-butyl titanate to provide a gel content of about 40%. This patent does not teach or suggest our sealant components or their collective performance illustrated herein.

U.S. Pat. No. 3,903,947:

This patent teaches the preparation of a laminated puncture sealing strip for pneumatic tires. The sealant composition contained in said strip can be EPDM plasticized with a paraffinic oil, together with conventional additives. There is no disclosure or suggestion in this patent that would lead one skilled in the art to prepare our unique sealant rubber blend containing conventional additives.

U.S. Pat. No. 2,756,801:

This patent is directed to the preparation of a puncture-sealing pneumatic tire; the sealant composition comprises butyl rubber modified by reaction with a small amount of a phenol such as dimethylol phenol; conventional additives are also utilized. There is no suggestion in this patent of the use of any hydrogenated polymer per se or in combination with a compatible tackifying polymer.

U.S. Pat. No. 2,935,109:

This patent is directed to the preparation of heat-sealable linings for use, primarily, in tubes and tubeless tires. The rubber component is a blend of soft gum rubber and a minor amount of an ethylene polymer, together with conventional additives. This patent does not disclose or teach any pertinent compounding suggestive of our sealant composition.

U.S. Pat. No. 3,048,509:

This patent teaches the preparation of puncture sealing means for pneumatic tires wherein a multi-layered tacky sealant layer is prepared containing conventional additives, the rubber component of said layer being a blend of natural rubber and selected SBR rubbers with or without reinforcing pigment. Clearly this is not suggestive of our unique sealant composition with its novel rubber component characterization.

U.S. Pat. No. 3,935,893:

This patent is directed to a sealant layer for a pneumatic tire that is made up of the combination of specific quantities of a high molecular weight curable butyl rubber, a low molecular weight curable butyl rubber, a liquid polybutene tackifier, and a partially hydrogenated block copolymer of styrene and a conjugated diene, carbon black, and suitable curing agents for the butyl rubber components.

U.S. Pat. No. 4,113,799:

This patent relates to carbon reinforced elastomeric sealant compositions comprising crosslinked butyl rubber as matrix sealant, the sealant composition comprising a high average molecular weight butyl rubber and a low average molecular weight butyl rubber in a specified ratio in admixture with a tackifier with or without including a partially hydrogenated block copolymer.

U.S. Pat. No. 4,064,922:

This patent is directed to a puncture sealing composition and a tire and combination with such a composition, the sealant comprising essentially: (a) a major proportion of a low molecular weight elastomer in admixture with a tackifying or plasticizing substance and (b) a minor proportion of a high molecular weight elastomer together with a crosslinking agent present in an amount sufficient to give a partial cure.

It is clear that a sealant composition, such as a tire sealant composition, in order to be most effective, must meet a set of very stringent requirements. For example, the sealant must not only exhibit the ability of adhering to a puncturing object such as a nail as the latter precesses about its initial position during tire travel but must also be capable of healing itself so as to effectively seal the puncture site once the nail is removed. In addition, the sealant must possess sufficient strength and integrity; first, in order to maintain its form stability in the tire; and secondly, to avoid "blowthrough" when the nail is removed. The tire sealant composition must be capable of retaining effectiveness over a wide temperature range ($-30$ T°C. 130) for an extended period corresponding to the service life of the tire.

The preceding prior art references, when taken singly or in any reasonable combination thereof, would not teach or suggest our unique sealant composition or its performance.

THE INVENTION

Our invention is directed to a sealant composition having as an essential component, at least one hydrogenated polybutadiene polymer that functions in said composition to provide continuity and strength; there is achieved a high degree of mutual compatibility of said polymer and the selected polymeric tackifying component. Our unique composition possesses a specific proportion of tackiness, resiliency and strength which renders said composition particularly suitable, for example, for use as a sealant in pneumatic tires.

Whereas, in practice, tire sealants have traditionally relied heavily on the use of such polymers as butyl, EPDM, depolymerized rubber, etc., the sealant composition of the present invention is a new composition of matter which is based on a polymer blend system employing a high molecular weight, hydrogenated polybutadiene as network forming polymer in admixture with a low molecular weight liquid elastomer, for example, polybutene, as tackifier in which a high degree of mutual compatibility exists between the high and low molelcular weight polymers.

Our composition contains a network polymer, a tackifier and a range of various ingredients, such as carbon black curatives, etc., normally used in the formulation of, for example, tire sealant compositions. The present invention is one wherein either all hydrogenated butadiene or a blend of hydrogenated butadiene and another high molecular weight polymer fully compatible with the particular hydrogenated butadiene selected is used, for example, EPR or EPDM. The tackifier, in turn, can be either a low molecular weight analogue of the hydrogenated polybutadiene network polymer or a low molecular weight analogue of the other high molecular weight network polymer heretofore referred to. The tackifier, however, can be a low molecular weight polymer of an entirely different type, for example, polybutene, the proviso being that it be fully compatible with the selected network polymer(s).

The hydrogenated polybutadiene should be selected from those having between 10 and 98% vinyl content prior to hydrogenation and a level of hydrogenation between 40 and 98%; the molecular weight of this network polymer should be between 80,000 and 400,000 for an acceptable degree of compatibility and sealant performance. We have shown that commercial butadiene (not hydrogenated) is grossly incompatible with polybutene at the levels required of a tire sealant composition.

The present invention requires a precise balance among tackiness, resiliency and strength which renders the composition effective as a sealant for use under dynamic conditions over a wide temperature range for extended periods of time.

The sealant composition of the present invention possesses the capability of providing, via various modes, an exacting balance between tackiness, resiliency and strength which are essential to effective sealant performance. Said sealant composition is capable of being "converted" to the sealant state either by conventional chemical curing means, by electron beam irradiation treatment, or by a combination of these methods. To be effective, our sealant composition is prepared to possess a unique balance as to tackiness, resiliency and strength; we utilize, as herein described, a high molecular weight, network-forming polymer in combination with a low molecular weight, tackifying polymer wherein the mutual compatibility of said polymers is of a high degree.

We have discovered that sealant performance can be significantly altered by changes in the rheology of our sealant composition to insure optimum sealant performance. We employ a network polymer whose rheology can, not only be varied by design, but controlled as well. The use of hydrogenated polybutadiene offers such rheological control in that its molecular weight, molecular weight distribution and its microstructure can be designed and controlled within narrow limits to meet sealant requirements.

A significant feature of our discovery is that the latitude in rheological properties of the composition can be extended by blending two or more hydrogenated polybutadiene polymers of different individual rheologies. For example, a hydrogenated, high vinyl polymer, when blended with a hydrogenated, low vinyl polymer, could particularly be suited for use in a sealant composition; this is opposed to the "conventional" polybutadiene since the hydrogenated structure results in lower residual unsaturation to offer greater heat stability. The key advantage to the use of hydrogenated polybutadiene in the practice of our invention is the dual capability of polymer design flexibility and greater heat stability—a combination which is difficult to attain with other elastomers.

The preferred number average molecular weight range for the hydrogenated polybutadiene that can be utilized in the practice of our invention is from 80,000 to 400,000; although an hydrogenated polybutadiene with a number average molecular weight outside this range would provide a composition with comparable sealing performance, the following must be considered. A lower molecular weight polymer would require a greater number of chemical crosslinks to reach equivalent effective crosslink density; that is, network formation would be more difficult to achieve. Also, the network so formed would be expected to be "less perfect," possibly resulting in lower tensile strength. On the other hand, a polymer exceeding the high end of the range would be more difficult to blend with the other polymers of the composition, especially the liquid tackifying component. In addition, processability through, for example, extrusion equipment, would be more difficult, resulting possibly in excessive die swell.

The preferred number average molecular weight range for the liquid tackifying polymer is from about 1,000 to about 5,000. The lower limit is established to prevent the tackifier from migrating into other tire components, a circumstance which might possibly occur in time with a very low molecular weight species. In addition, the cohesive strength of the sealant is desirably greater using liquid tackifiers with a number average molecular weight greater than the lower limit mentioned. Although the liquid tackifier can exceed the upper molecular weight of about 5,000 to some degree, if too high, sealant conformability will be diminished resulting in low adhesive strength.

As to the ratio of hydrogenated polybutadiene to liquid tackifier, the preferred ratio is 10-30 hydrogenated polybutadiene/90-70 liquid tackifier. The lower limit of the blend ratio; i.e., 10/90 is set in order to impart sufficient elastic properties and cohesive strength to the sealant composition. The upper limit is established to insure that the composition retains the proper degree of flexibility and tack. If the upper ratio is exceeded, the modulus could possibly become too high and/or the tack too low, thus resulting in poor sealant performance.

As to alternate tackifying polymers that can be utilized in the practice of our invention, any liquid polymer which is fully compatible with the network polymer can be substituted for the polybutene liquid tackifier. Among these are, for example, liquid ethylene-propylene copolymer, liquid ethylene-propylene-diene terpolymer, liquid polybutadiene, liquid hydrogenated polybutadiene and liquid butyl rubber. Known solid, hydrocarbon tackifying resins can replace from about 1-20% of the liquid tackifier.

As to alternate network polymers that can be utilized, the hydrogenated polybutadiene component of the present invention sealant composition includes the hydrogenated versions of the various isomeric forms of polybutadiene homopolymer such as the 1,2 and 1,4 structures, and other hydrogenated structures derived from 1,3 butadiene. Also included are the hydrogenated versions of butadiene copolymer such as, for example, hydrogenated, random copolymers of styrene/butadiene, acrylonitrile-butadiene, and other diene containing polymers such as, for example, EPDM; the particular structure selected is not critical.

DESCRIPTION AND FUNCTION OF COMPOUND INGREDIENTS

Indopol H-300: Amoco Chemicals Corp.

The backbone structure of this polymer consists essentially of polyisobutylene; however, a small amount of 1- and 2A-butenes may be present in the lower molecular weight fractions. The polymer is prepared by polymerizing an isobutylene-rich stream with a metal halide catalyst.

The function of this liquid polymer in the composition is: (a) to lower the modulus of the network polymer thus providing the composition with the required degree of conformability to effectively function as a puncture sealant, and (b) to increase the tack of the composition, thus increasing its ability to adhere to puncturing objects.

Vistanex L-80: Exxon Chemical Co.

This material is a high molecular weight solid elastomer of polyisobutylene. It is intended to be used in the irradiation-curable sealant composition where its function is: (a) to provide sufficient green strength to the composition initially, thus enabling the sealant to be incorporated into the green tire via conventional tire building techniques, and (b) after degrading to a lower molecular weight species upon irradiation, to provide the composition with increased tack.

MT Carbon Black

This material is a non-reinforcing filler that can be utilized in our composition to provide increased processability and supply reaction sites during crosslinking of the network forming polymer.

The last four additives listed in Table I, page 13 of the patent application comprise a conventional accelerated-sulfur curing package with sulfur being the primary crosslinking agent. The degree of crosslinking achieved with this or other curing systems is such as to prevent flow of the sealant at the high temperature experienced in the running tire and to provide the sealant with sufficient resiliency for proper sealant performance.

The term liquid tackifier, as used herein, refers to the polymer in the liquid state per se.

Fully compatible implies that the polymer components of the composition form a homogeneous blend and will not phase-separate during the service life of the sealant. Insufficient compatibility, on the other hand, could result in a blend morphology wherein the network polymer, owing to its higher viscosity and low concentration, becomes the dispersed phase in an otherwise continuous liquid polymer medium. Such a morphology could manifest itself in poor physical properties, e.g., poor elasticity, poor resistance to flow, etc., thus rendering the composition ineffective as a puncture sealant. As a complication, the separated liquid polymer could possibly migrate into other tire components for which it may have equal or greater affinity.

Tack in the sense used herein refers to the ability of the sealant to wet the surface of and adhere to puncturing objects as well as to the base stock of the tire.

Resilience refers to the ability of the sealant to respond quickly to and follow the displacement motions of the nail during tire level. In a stricter sense, it is a measure of the sealant's ability to recover from deformation.

Strength refers to the cohesive strength of the composition as it relates to the ability to effectively seal the puncture site, after the nail is removed, without being blown through the site by the internal pressure of the tire.

Balanced properties refers to a combination of elasticity, tackiness and cohesive strength such that the composition will function effectively as a puncture sealant. That is, if the material is too elastic, for example, its conformability would diminish, hence its ability to wet (thus adhere to) the surface of a puncturing object would diminish. If the material were deficient in strength, its ability to seal a puncture site from which the nail had been removed would be decreased as the material might not be able to withstand the internal pressure of the tire. Finally, if the material possessed a good measure of both elasticity and strength but was deficient in tack, its ability to adhere to puncturing objects would be diminished.

Alternate Curing Systems

The sealant composition of the present invention can be cured with any suitable crosslinking agent, functioning either alone or in the presence of an activator, which can effect crosslinking to the required level. Among these are the conventional accelerated-sulfur types, quinoid types activated by a suitable oxidant, and the use of electron beam irradiation.

A combinatiion of chemical and irradiation cure would be desirable, for example, in the case where the sealant, in the form of a separate layer, is to be incorporated into the green tire. To increase the sealant's resistance to flow during storage and tire building, the sealant layer could be given a light precure at R.T. via irradiation. Full cure would then be effected chemically at the higher temperature in the tire curing press.

Alternate Solvents

In addition to hexane, other hydrocarbon solvents capable of dissolving the network polymer and tackifying polymers (or resins) could be used, e.g., cyclohexane, toluene, pentane and heptane.

The following example is representative and can be varied within the context of our total specification disclosure as it would be comprehended and practiced by one skilled in the art. Composition components are listed on a dry weight basis.

EXAMPLE

Compositions 1 to 4 of Table I were prepared by combining the listed ingredients in hexane as solvent. After blending, the respective compositions were stripped of solvent and then compression molded (i.e., cured) for 30 min. at 150° C.

TABLE I

|  | 1 | 2 | 3 | 4 |
|---|---|---|---|---|
| Hydrogenated 1,2 PBd | 20 | 20 | 20 | 20 |
| Indopol H-300 | 80 | 80 | 80 | 40 |
| Vistanex L-80 | — | — | — | 40 |
| MT Carbon Black | 10 | 10 | 10 | 10 |
| Sulfur | 2 | 1 | 0.5 | 2 |
| Methylbenzothiazyl Disulfide | 1.25 | 0.63 | 0.31 | 1.25 |
| Diorthotolylguanidine | 1.5 | 0.75 | 0.38 | 1.5 |
| ZnO | 3 | 1.5 | 0.75 | 3 |

The hydrogenated, high vinyl polybutadiene polymer used in these compositions was prepared from a base polymer of polybutadiene having an $\overline{M}_n=325,000$, $\overline{M}_w=383,000$ and a microstructure comprising, on a mole basis, 98% vinyl isomer and 2% cis and trans isomer.

A diluted solution of the base polymer in toluene was charged to the reactor vessel, after which the contents were degassed under vacuum at R.T. The reactor was then pressurized with hydrogen to 25 psi and the temperature was raised to approximately 50° C. After releasing the pressure, a nickleoctoate/triisobutylaluminum/cyclohexene catalyst was added. The pressure in the vessel was then increased to between 94–163 psi hydrogen, after which the temperature rose to approximately 88° C. The reaction was allowed to proceed until 85.5 mole % of vinyl groups had been hydrogenated.

The cured stocks of Table I were evaluated as regards stress-strain properties, crosslink density and stock recovery. Stress-strain data was obtained using ¼" strips tested in triplicate on the Instron. Crosslink density was determined from swelling measurements in hexane and reported as the volume fraction of rubber, $V_r$, remaining in the swollen sample. Finally, stock recovery is reported as the ratio of the returned area to the total area under the stress-strain curve determined at 500% elongation (except for composition 4 which was tested at 300% elongation). Table II illustrates the above findings.

TABLE II

| Composition No. | 300% Mod. psi | Tens. Str. psi | Ult. Elong. % | $V_r \times 10^2$ | Recovery % |
|---|---|---|---|---|---|
| 1 | 3.4 | 11 | 690 | 2.58 | 83 |
| 2 | 3.1 | 9.4 | 845 | 1.35 | 69.7 |
| 3 | 1.5 | 4.3 | 945 | 1.21 | 59.8 |
| 4* | 16 | 23 | 480 | 3.91 | 72 |

*Irradiated to 10 Mrads subsequent to curing.

A comparison of the data in Table II illustrates the dependence of stress-strain properties and stock recovery on crosslink density and presence of higher molecular weight tackifying polymer (Vistanex L-80).

By selecting level of network polymer, degree of crosslinking, presence of higher molecular weight, tackifying polymer, etc., a sealant composition possessing an optimum combination of tackiness, resiliency and strength can be achieved. A composition of this nature is particularly suitable for use under dynamic conditions such as would be experienced in a tire; however, the sealant composition of this invention would also find utility as, for example, a caulking compound or roofing sealant.

It will be understood that the various composition components and procedures of the preceding representative example can be varied with functionally equivalent components, in the required proportions to achieve essentially the same results with a minimum of routine experimentation and/or optimization.

We claim:

1. A sealant composition containing conventional additives and, as essential rubber components, a fully compatible blend of (1) a high molecular weight, hydrogenated polybutadiene homopolymer having a molecular weight of between 80,000 and 400,000, a vinyl content prior to hydrogenation of between 10 and 98% and a level of hydrogenation of between 40 and 98%; and (2) a low molecular weight liquid elastomer, said hydrogenated polymer providing a crosslinked network in said elastomer wherein the ratio of the polybutadiene (1) to elastomer (2) is 10-30 to 90-70.

2. A sealant composition containing conventional additives and, as essential rubber components, a fully compatible blend of (1) a high molecular weight, hydrogenated polybutadiene homopolymer having a molecular weight of between 80,000 and 400,000, a vinyl content prior to hydrogenation of between 10 and 98% and a level of hydrogenation of between 40 and 98%; and (2) polybutene, said hydrogenated polymer providing a cross-linked network in said elastomer wherein the ratio of the polybutadiene (1) to polybutene (2) is 10-30 to 90-70.

3. The composition of claim 1 wherein the polybutadiene (1) is a blend of two or more hydrogenated polybutadienes.

4. The composition of claim 1 wherein the polybutadiene (1) is a blend of a high vinyl, prior to hydrogenation, polybutadiene and a low vinyl, prior to hydrogenation, polybutadiene.

5. The composition of claim 1 or 2 wherein the elastomer (2) has a number average molecular weight of from about 1,000 to about 5,000.

6. The composition of claim 1 wherein the elastomer (2) is a liquid polymer of number average molecular weight of from about 1,000 to about 5,000 selected from the group consisting of polybutene, ethylene-propylene copolymer, ethylene-propylenediene terpolymer, polybutadiene, hydrogenated polybutadiene and butyl rubber.

7. The composition of claim 6 wherein about 1–20% of the liquid polymer is replaced with a conventional solid, hydrocarbon tackifying resin.

8. The composition of claim 2 wherein the polybutadiene (1) is a high vinyl polybutadiene hydrogenated to a level of about 85% having a number average molecular weight of about 325,000 and the ratio of polybutadiene (1) to polybutene (2) is about 20 to about 80.

9. The composition of claim 2 wherein the polybutadiene (1) is a high vinyl polybutadiene having a number average molecular weight of about 325,000 hydrogenated to a level of about 85 mole % of the vinyl groups, there is also present a high molecular weight solid elastomer of polyisobutylene and the ratio of polybutadiene (1) to polybutene (2) to solid polyisobutylene is about 20 to about 40 to about 40 and the tire has been irradiated to about 10 Mrads subsequent to curing.

* * * * *